(12) United States Patent
Pellenc

(10) Patent No.: US 8,579,041 B2
(45) Date of Patent: Nov. 12, 2013

(54) SAFETY DEVICE FOR PORTABLE TOOLS WITH A HEAT ENGINE, CAPABLE OF STOPPING THE OPERATION THEREOF AFTER SUDDEN, VIOLENT MOVEMENTS

(75) Inventor: Roger Pellenc, Pertuis (FR)

(73) Assignee: Pellenc (Societe Anonyme), Pertuis (FR)

( * ) Notice: Subject to any disclaimer, the term of this patent is extended or adjusted under 35 U.S.C. 154(b) by 374 days.

(21) Appl. No.: 13/055,217

(22) PCT Filed: Aug. 25, 2009

(86) PCT No.: PCT/FR2009/001027
§ 371 (c)(1),
(2), (4) Date: Mar. 15, 2011

(87) PCT Pub. No.: WO2010/023377
PCT Pub. Date: Mar. 4, 2010

(65) Prior Publication Data
US 2011/0186319 A1 Aug. 4, 2011

(30) Foreign Application Priority Data

Aug. 29, 2008 (FR) ...................................... 08 04753

(51) Int. Cl.
*B27B 17/08* (2006.01)
(52) U.S. Cl.
USPC ............... 173/2; 173/176; 173/183; 173/217; 30/381; 30/382; 340/680; 340/683
(58) Field of Classification Search
USPC ........ 173/2, 176, 183, 217; 30/123, 381, 382; 83/821, 830; 227/8, 10, 130; 364/474.1, 474.19; 408/6, 9; 318/602; 188/137; 700/168; 706/900; 340/680, 340/683; 73/514.04
See application file for complete search history.

(56) References Cited

U.S. PATENT DOCUMENTS

| 3,923,126 | A | | 12/1975 | Bidanset | |
|---|---|---|---|---|---|
| 4,152,833 | A | * | 5/1979 | Phillips ........................... | 30/382 |
| 4,298,072 | A | * | 11/1981 | Baker et al. ..................... | 173/13 |
| 4,573,556 | A | * | 3/1986 | Andreasson .................. | 188/137 |
| 4,794,273 | A | * | 12/1988 | McCullough et al. ........ | 307/139 |
| 5,490,081 | A | * | 2/1996 | Kuromoto et al. ............ | 700/178 |
| 5,526,915 | A | * | 6/1996 | Bessette et al. ............... | 192/130 |
| 5,534,854 | A | * | 7/1996 | Bradbury et al. ............. | 340/648 |
| 5,584,619 | A | * | 12/1996 | Guzzella .......................... | 408/9 |
| 5,914,882 | A | | 6/1999 | Yeghiazarians | |
| 5,984,020 | A | * | 11/1999 | Meyer et al. ....................... | 173/2 |
| 5,996,707 | A | * | 12/1999 | Thome et al. ..................... | 173/2 |
| 6,111,515 | A | * | 8/2000 | Schaer et al. ................. | 340/680 |
| 6,484,814 | B2 | * | 11/2002 | Bongers-Ambrosius ......... | 173/2 |
| 6,520,266 | B2 | * | 2/2003 | Bongers-Ambrosius et al. ................................ | 173/2 |
| 7,011,165 | B2 | * | 3/2006 | Kristen et al. .................... | 173/1 |
| 7,055,620 | B2 | * | 6/2006 | Nadig et al. ...................... | 173/2 |

(Continued)

*Primary Examiner* — Scott A. Smith
(74) *Attorney, Agent, or Firm* — Egbert Law Offices, PLLC

(57) ABSTRACT

A safety apparatus for a portable tool having an internal combustion engine has at least one accelerometer providing a measurement of an acceleration of the portable tool in at least one plane or axis. An electronic controller is connected to an output of the accelerometer so as to receive analog or digital information. A generator is driven by the internal combustion engine so as to supply power to the accelerometer. A management card processes the analog or digital information so as to activate the system acting on an ignition exciter box so as to nearly instantaneously stop the internal combustion engine when the acceleration of the portable tool exceeds a predetermined level.

7 Claims, 3 Drawing Sheets

(56) References Cited

U.S. PATENT DOCUMENTS

| | | | |
|---|---|---|---|
| 7,395,871 B2 * | 7/2008 | Carrier et al. | 173/1 |
| 7,403,131 B2 * | 7/2008 | Gossett et al. | 340/680 |
| 7,681,659 B2 * | 3/2010 | Zhang et al. | 173/1 |
| 2004/0125596 A1 | 7/2004 | Brooks | |
| 2004/0181951 A1 | 9/2004 | Wittke | |
| 2005/0055832 A1 | 3/2005 | Jaensch | |
| 2007/0008162 A1 | 1/2007 | Gossett | |

* cited by examiner

SAFETY DEVICE FOR PORTABLE TOOLS WITH A HEAT ENGINE, CAPABLE OF STOPPING THE OPERATION THEREOF AFTER SUDDEN, VIOLENT MOVEMENTS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns a device for portable tools with internal combustion engines ensuring the instantaneous, automatic stopping of the operation of the latter after sudden and violent movements to which they are exposed during their use, in order to ensure the user's safety. It applies in particular to chain saws with internal combustion engines.

2. Description of Related Art Including Information Disclosed Under 37 CFR 1.97 and 37 CFR 1.98

Official regulations require chain saws to be equipped with a safety device ensuring the stopping of the tool in the event of a strong recoil or "kick back" as professionals call it and which corresponds to an acceleration expressed in m/s$^2$ (between 700 and 2000 m/s$^2$, depending on the type of tool).

At present, in chain saw applications, this device consists most often of a mechanical means which covers the front handle and which, either by inertia tied to the kick back or by striking the hand holding this handle during a violent acceleration, activates a system which brakes the drive of the cutting chain until the engine of the tool stops.

A comparable device is described for instance in the EP-1350607 document.

These safety devices consisting of mechanical means present however several drawbacks: they function only through inertia when the tool is held with only one hand; they work only in a single plane (forward/backward) and do not function in the other planes; they can, in case of a violent kick back, cause injuries due to the shocks on the hand in contact with the device; their trip point through inertia is very high due to the fact that the masses in motion are very small (between 700 and 2000 m/s$^2$, depending on the type of tools); their response time is relatively slow (in the range of 10 to 15 milliseconds); their sensitivity is not adjustable; they function by action on the tool properly speaking (for example on the chain in the chain saw application); they are subject to wear due to friction; they can become blocked in the off-position; and they are relatively bulky and expensive.

In documents US-2004/0181951 and US-2007/0008162 are described portable electric tools equipped with a safety system consisting of accelerometers on three axes capable of commanding the operations of said portable electrical tools to stop, via a logic circuit when a predetermined trip point of acceleration has been reached. These safety systems are not applicable to portable tools with internal combustion engines such as chain saws.

BRIEF SUMMARY OF THE INVENTION

The aim of the present invention is more precisely a safety device for portable tools with internal combustion engines which is capable of automatically and instantaneously stopping said tools in case of a violent kick back, while at the same time doing away with the aforementioned drawbacks of the anti-kick back systems based on the activation of mechanical means or of electronic means applied to portable electric tools.

The device for portable tools with internal combustion engines according to the invention is noteworthy in that it includes at least one electronic accelerometer capable of providing a measure of acceleration based on at least one plane or axis, the outlet, or each outlet, of this accelerometer being connected to an electric and/or electronic controlling device configured to process the analog or digital electric information coming from the accelerometer and to command the virtually instantaneous stop of the operation of the tool, when a predetermined trip point of acceleration has been reached.

According to a preferred application method of the device of the invention, advantageously applicable to portable tools with internal combustion engines, said control device includes an electric and/or electronic controlling device configured to process the analog or digital electric information coming from the accelerometer and to command a braking component which acts directly on the output shaft of the engine and/or on the spark advance mechanism.

The device for portable tools with internal combustion engines according to the invention provides interesting advantages, such as: the accelerometer acts directly on the internal combustion engine of the tool, through the intermediary of electric or electronic management devices; the response time of the device is very short (in the range of a few milliseconds); they do not feature the utilization of mobile components, so that they are not subject to any wear; possibility of lowering the trip point of the safety device, due to the fact that inertia and moving mass are not involved in the operation of the device, only acceleration being taken into account; possibility of adjusting the sensitivity by programming the trip point; possibility of functioning in several planes; possibility of checking the proper operation of the device at the time of starting the internal combustion engine by using an electric and/or electronic means of control capable of performing a self-check of the operation of the accelerometer; the device is lighter and more economical than mechanical safety devices.

According to another characteristic disposition, detection of the accelerations is ensured by a dual-axis electronic accelerometer or by at least two mono-axis electronic accelerometers provided on the portable tool and so positioned that one axis can be privileged.

According to another characteristic disposition, detection of the accelerations is ensured by an accelerometer with three axes.

It is therefore possible to measure acceleration in several planes, making it possible to avoid the annoying consequences of kick backs in dangerous working positions, this particular feature allows in effect to have the same degree of safety, no matter how the portable tool is held and what the user's working position might be. For example, during tree pruning work the user climbs into the tree and holds the tool with one hand while the other hand serves to ensure his position by holding on to the branches.

BRIEF DESCRIPTION OF THE DRAWINGS

The above aims, characteristics and advantages and still others, will become clearer from the following description and the attached drawings in which:

FIG. 1A' is a perspective view in a schematic manner of a first example of production of a portable tool according to the invention, the tool shown, according to this example, consisting of a chain saw with an internal combustion engine with an electric and/or electronic means of control and a brake control combined in a single control.

FIG. 1B' a perspective view in a schematic manner of a first example of production of a portable tool according to the invention, the tool shown, according to this example, consisting of a chain saw with an internal combustion engine with an electric and/or electronic means of control and an electronic ignition housing combined in a single control.

Figure 1A:
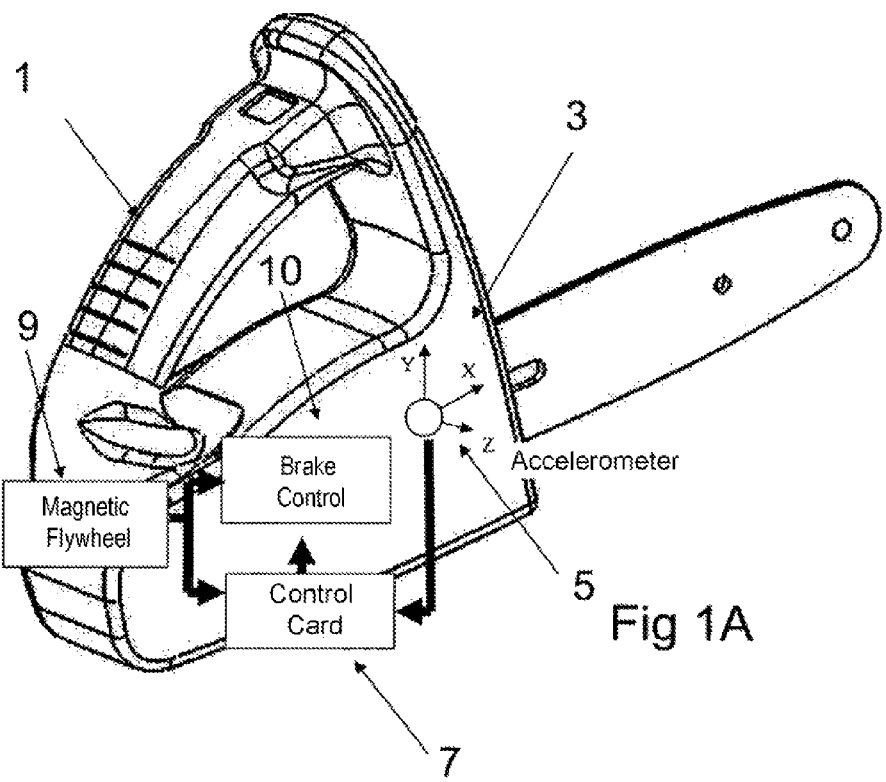
FIG. 1A is a perspective view in a schematic manner of a first example of production of a portable tool according to the invention, the tool shown, according to this example, consisting of a chain saw with an internal combustion engine with a separate electric and/or electronic means of control and a brake control.

Reference is made to said drawings to describe interesting, although by no means limiting, examples of production of portable tools with internal combustion engines according to the invention.

DETAILED DESCRIPTION OF THE INVENTION

Below is described a very advantageous application of a portable tool with an internal combustion engine which, according to the example shown, consists of a chain saw 1. However, one needs to keep in mind that the invention is applicable to any dangerous portable tool with an internal combustion engine, in particular to any portable tool with an internal combustion engine that one wants to provide with a safety device capable of stopping its operation instantly in case of a sudden violent movement or kick back. These can include, for example: chain saws, brush cutters or augers with internal combustion engines, etc.

The invention is applicable to portable tools driven by internal combustion engines, i.e., to equipment where the actually active tool 2 (a chain in the case of chain saws 1 shown in FIGS. 1A to 1B) is driven by an internal combustion engine M', enclosed in a body or housing 3 and supplied with electrical current by a magnetic flywheel 9.

This electrical source 9 serves also to supply the various electric or electronic cards of the tools. It is driven by the internal combustion engine. It could be replaced by another generator of electrical current, for instance by a dynamo or other, also actuated by the internal combustion engine.

According to the safety device of the invention, at least one accelerometer 5, capable of measuring an acceleration on at least one plane or axis (for example axis X: forward/backward) is incorporated into the tool, preferably in a location situated at or near the center of gravity of the latter. The advantage of this location is to allow direct processing of the information coming from the accelerometer or the accelerometers, by an electronic management card integrated in the tool. However, if for reasons of constructional layout this accelerometer or these accelerometers are moved away from the center of gravity, the information coming from the accelerometer(s) located at or near the center of gravity needs to be corrected so that it corresponds to the information that would be coming from the accelerometer(s) located at or near the center of gravity of the latter, by means of the micro-controller of the integrated management card and by a simple mathematical calculation that is known as such, this corrected information can be processed in the same manner as that presented in this description.

The accelerometer(s) 5 can also be positioned near the grip handles of the tool.

According to a method of execution of the tool, the latter is equipped with an electronic accelerometer for two axes or at least two electronic single-axis accelerometers, each providing a signal that is representative of the acceleration experienced by one of the two axes concerned, for example axis X (forward/backward) and axis Y (upward/downward) so as to allow a measurement of the accelerations in two planes.

According to a preferred method of execution of the tool, it is equipped with an electronic accelerometer for three axes X, Y, and Z, the outputs of which providing electrical analog or digital information representative of the acceleration experienced by the axis concerned, so as to allow a measurement of the accelerations in three planes.

The two single-axis accelerometers or the two-axes accelerometer or the three-axis accelerometer are/is so positioned that one axis can be privileged.

Figure 1B:
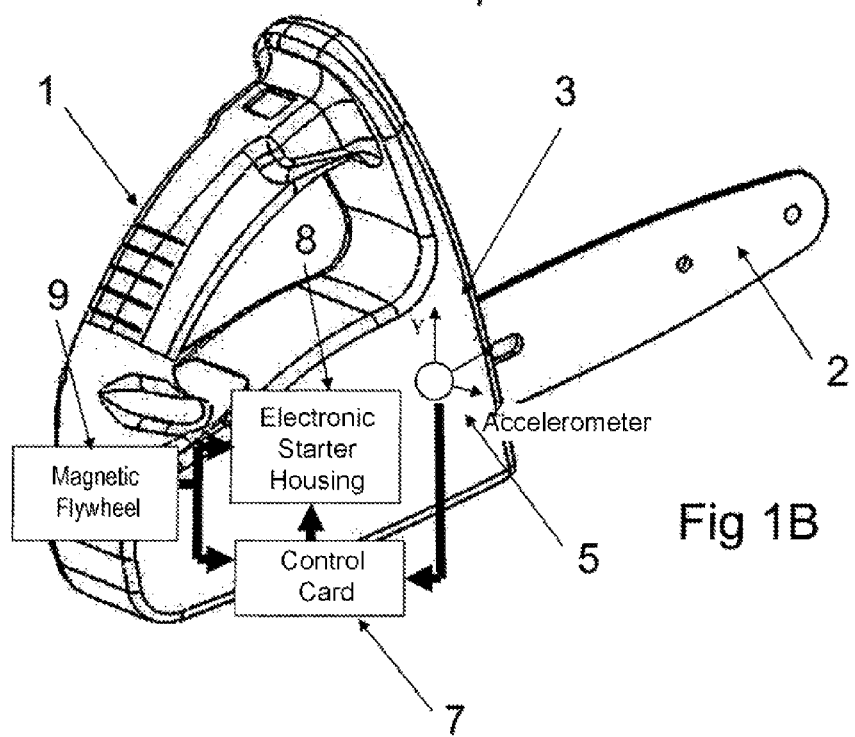
FIG. 1B is a perspective view in a schematic manner of a first example of production of a portable tool according to the invention, the tool shown, according to this example, consisting of a chain saw with an internal combustion engine with a separate electric and/or electronic means of control and an electronic ignition housing.
Figure 1A:
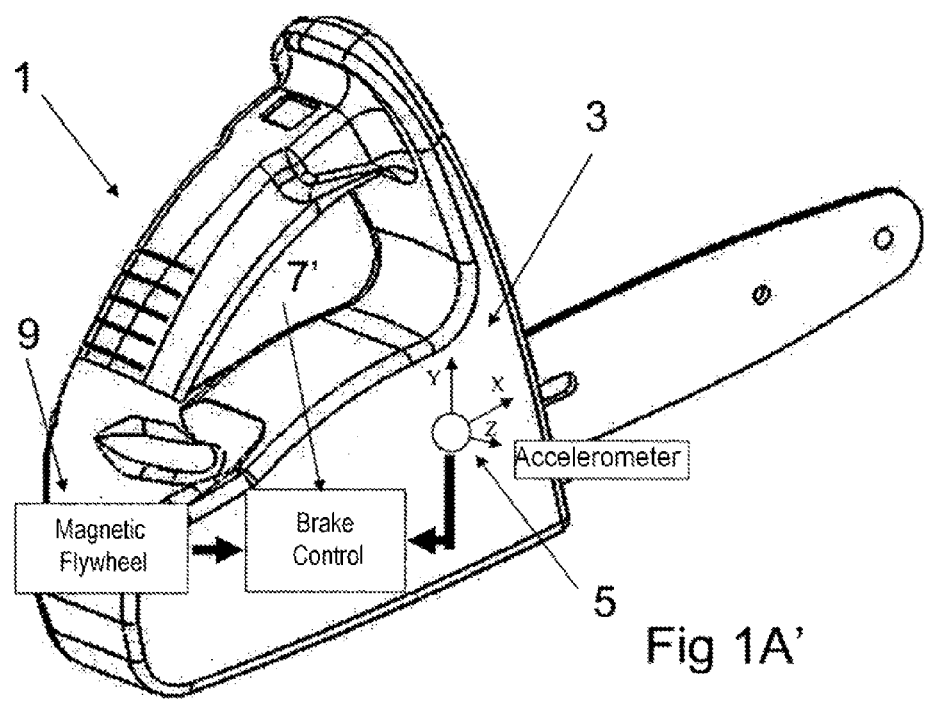
Figure 1B:
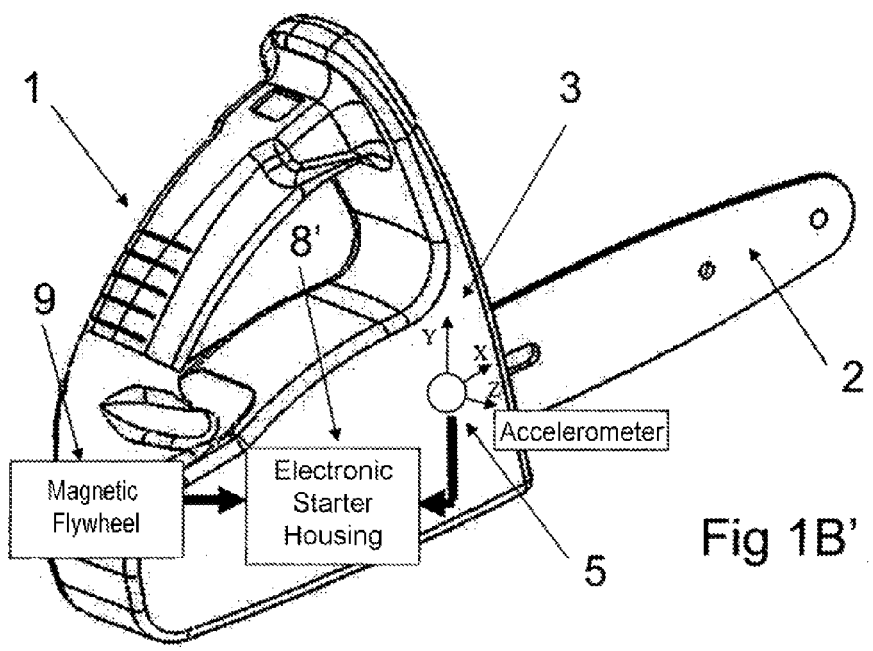

The output of accelerometer 5 or of the accelerometers, is connected: either to an electrical and/or electronic means of control 7, configured for processing the analog or digital electrical information provided by the accelerometer(s), and to command a braking element 10 acting directly on the output shaft of the engine M' (FIG. 1A); or, to an electrical and/or electronic means of control, configured for processing the analog or digital electrical information provided by the accelerometer(s), and to act on the spark advance 8 in order to brake the engine M' (FIG. 1B).

In both cases, several solutions are possible.

Figure 2:
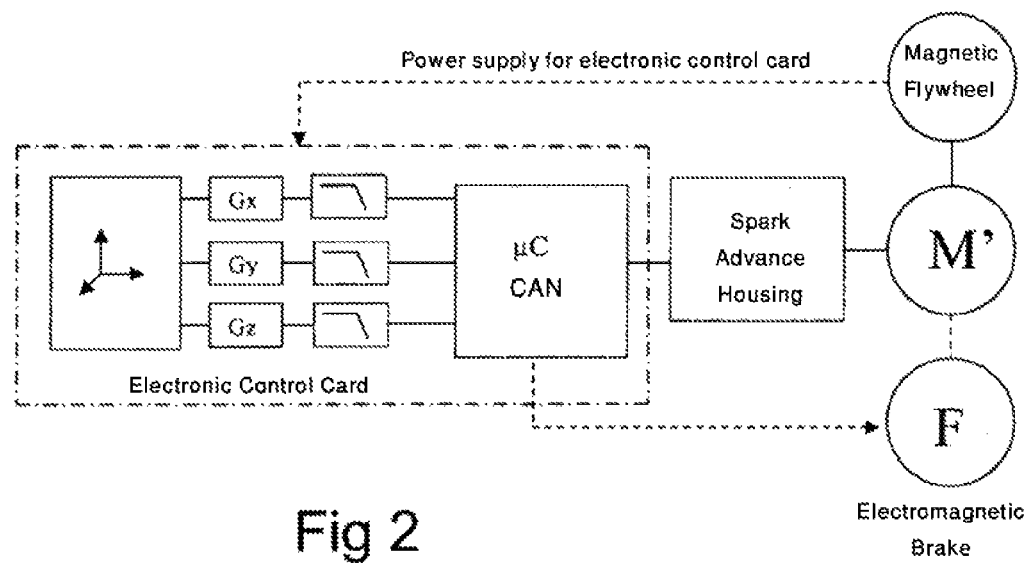
FIG. 2 is a schematic diagram of an example of application, in an analog mode, of the device of the invention, applicable to a portable tool with an internal combustion engine.

A first solution is presented by the schematic of FIG. 2. In this case, the processing by the electrical and/or electronic means of control of the analog signal(s) provided by the accelerometer(s) by the digital processing unit allows, once the brake engagement conditions are met, to send a command either to the independent braking system F, or to the electronic spark advance housing, in order to brake the engine M'.

Figure 3:
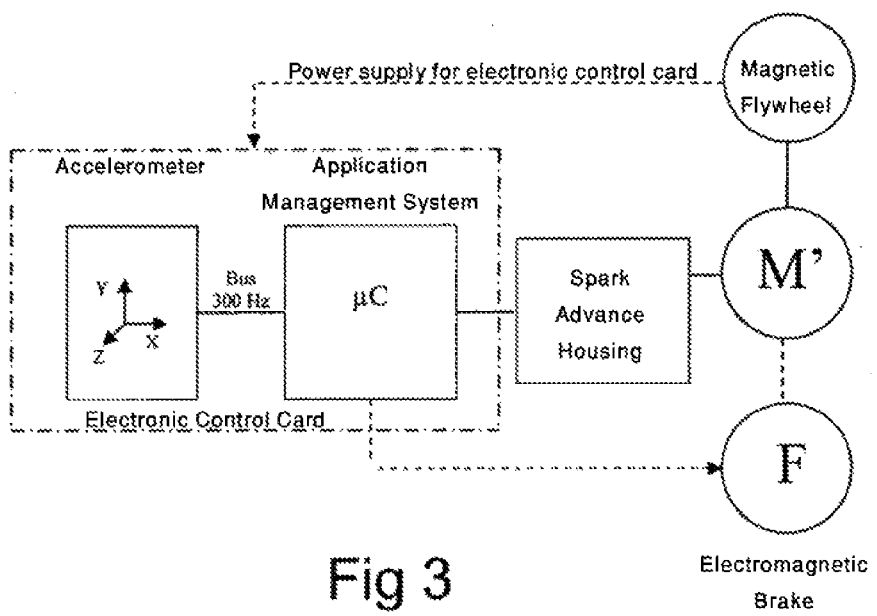
FIG. 3 is a schematic diagram of another example of application, in digital mode, of this device.

A second solution is presented by the schematic of FIG. 3. In this case, the processing by the electrical and/or electronic means of control of the digital signal(s) provided by the accelerometer(s) by the digital processing unit allows, once the brake engagement conditions are met, to send a command either to the independent braking system F, or to the electronic spark advance housing, in order to brake the engine M'.

The electrical, analog or digital information provided by the accelerometer(s) is processed: either, by an electrical and/or electronic brake control card 7, activating a braking system 10 known as such, this system consisting for example: according to the method of execution shown in FIG. 1A, by an electromagnetic band brake or a device acting directly on the chain, such as for instance a latch placing itself between the teeth of the chain; or at the electronic ignition housing 8 (FIG. 1B):

By cutting off the electric power to the internal combustion engine M' and/or by acting on the sparking advance of said internal combustion engine M', in order to shut it off through the intermediary of an electronic card acting on the electronic ignition housing 8 or which could be directly included in said electronic ignition housing 8. In effect, if the sparking advance is modified before it is shut off, a torque force in the opposite direction of the normal operation is created, acting as a very powerful brake and triggering the virtually immediate stalling of the engine (this stalling is effective after 1 to 3 revolutions of the engine, that is to say in 0.01 to 0.06 seconds).

The control card 7 and the brake command 10 may be arranged on a single control card T as per FIG. 1A'.

The control card 7 and the electronic ignition housing 8 may be arranged on a single control card 8' as per FIG. 1B'.

I claim:

1. An apparatus comprising:
    a portable tool having an internal combustion engine, said portable tool having an electronic ignition exciter box;
    at least one electronic accelerometer providing a measurement of an acceleration of said portable tool in at least one plane or axis, the electronic accelerometer having an output, the output of the accelerometer being analog or digital electrical information;
    an electronic controller connected to said output of the electronic accelerometer, said electronic controller having an electronic management card; and
    a generator driven by said internal combustion engine, said generator supplying electrical power to the electronic accelerometer and to said electronic management card, said electronic management card processing the analog or digital electrical information so as to activate a system acting on said electronic ignitor exciter box so as to nearly instantaneously stop said internal combustion engine when the measurement of the acceleration exceeds a predetermined level.

2. The apparatus of claim 1, said system acting on a programmed spark advance of said internal combustion engine so as to cause said internal combustion engine to stop, said electronic ignition exciter box having an electronic card therein, said system communicating with said electronic card of said electronic ignition exciter box.

3. The apparatus of claim 1, the electronic accelerometer providing the measurement of acceleration in at least two axes.

4. The apparatus of claim 3, the electronic accelerometer being a three-axis accelerometer.

5. The apparatus of claim 1, the electronic accelerometer comprising:
    a first single-axis accelerometer; and
    a second single-axis accelerometer having an axis of measurement different than an axis of measurement of said first single-axis accelerometer.

6. The apparatus of claim 1, said portable tool having a center-of-gravity, the electronic accelerometer positioned adjacent said center-of-gravity.

7. The apparatus of claim 1, said portable tool selected from the group consisting of chain saws, circular cross-cut saws, drills, disc grinders, and planers.

* * * * *